(12) United States Patent
Rozak-Draicchio

(10) Patent No.: US 9,760,728 B2
(45) Date of Patent: Sep. 12, 2017

(54) SYSTEM AND METHOD FOR MANAGING LOGICAL CHANNELS FOR ACCESSING SEVERAL VIRTUAL PROFILES IN A SECURE ELEMENT

(71) Applicant: GEMALTO INC., Austin, TX (US)

(72) Inventor: Lionel Rozak-Draicchio, Austin, TX (US)

(73) Assignee: GEMALTO SA, Meudon (FR)

( * ) Notice: Subject to any disclaimer, the term of this patent is extended or adjusted under 35 U.S.C. 154(b) by 37 days.

(21) Appl. No.: 14/693,010

(22) Filed: Apr. 22, 2015

(65) Prior Publication Data
US 2016/0314309 A1  Oct. 27, 2016

(51) Int. Cl.
*H04L 29/06* (2006.01)
*G06F 21/62* (2013.01)
(Continued)

(52) U.S. Cl.
CPC ...... *G06F 21/6218* (2013.01); *G06F 9/45558* (2013.01); *G06F 21/53* (2013.01);
(Continued)

(58) Field of Classification Search
CPC .................................................. G06F 21/6218
See application file for complete search history.

(56) References Cited

U.S. PATENT DOCUMENTS 6,118,788 A * 9/2000 Kermani ............. H04L 12/5602
370/461
8,340,697 B1 * 12/2012 Partovi ............... H04L 65/4076
370/395.41
(Continued)

FOREIGN PATENT DOCUMENTS

FR    EP 2461613 A1 * 6/2012 ............ H04W 4/001
WO   WO 2008/123827 A1   10/2008

OTHER PUBLICATIONS

Anonymous, "ISO/IEC 7816 Part 4: Interindustry Command for Interchange", Retrieved from the Internet: URL:http://read.pudn.com/downloads132/doc/comm/563504/ISO-IEC7816/ISO-IEC7816-4.pdf [retrieved on Jun. 7, 2016], Jul. 24, 2008, pp. 1-73, XP055278373.
(Continued)

*Primary Examiner* — Shawnchoy Rahman
(74) *Attorney, Agent, or Firm* — Buchanan Ingersoll & Rooney PC

(57) ABSTRACT

The invention is a system comprising a host device and a secure element including a plurality of virtual profiles and an execution component configured to run simultaneously several of said virtual profiles. The system comprises a discovery agent configured to provide a subset of the plurality of virtual profiles, configuration data for each virtual profile of said subset and capability data reflecting the maximum of logical channels handled by the host device. The system comprises an allocating agent configured to cooperate with the discovery agent to allocate a range of logical channels to each virtual profile of the subset based on the capability data and to determine in each of the ranges a main logical channel which remains permanently available when the virtual profile to which the range is allocated has been booted.

20 Claims, 2 Drawing Sheets

(51) Int. Cl.
*G06F 21/53* (2013.01)
*G06F 21/77* (2013.01)
*G06F 21/78* (2013.01)
*G06F 9/455* (2006.01)

(52) U.S. Cl.
CPC .............. *G06F 21/77* (2013.01); *G06F 21/78* (2013.01); *G06F 2009/45587* (2013.01)

(56) References Cited

U.S. PATENT DOCUMENTS

| | | | |
|---|---|---|---|
| 2011/0306318 A1* | 12/2011 | Rodgers | H04W 8/183 |
| | | | 455/410 |
| 2012/0260095 A1* | 10/2012 | Von Hauck | H04L 9/3228 |
| | | | 713/176 |
| 2012/0289193 A1 | 11/2012 | Bergenwall | |
| 2013/0227646 A1 | 8/2013 | Haggerty et al. | |
| 2014/0342719 A1 | 11/2014 | Lindholm | |

OTHER PUBLICATIONS

International Search Report and Written Opinion of the International Searching Authority (Forms PCT/ISA/237, PCT/ISA/210 and PCT/ISA/220) issued on Jun. 14, 2016, by the International Bureau of European Patent Office in corresponding International Application No. PCT/EP2016/056731. (13 pages).

* cited by examiner

| SD-AID | STATE | REQUIRED LOGICAL CHANNELS |
|---|---|---|
| AID1 | ENABLED | 3 |
| AID2 | DISABLED | 2 |
| AID3 | ENABLED | 2 |

FIG. 2

| SD-AID | STATE | REQUIRED LOGICAL CHANNELS | ALLOCATED RANGE |
|---|---|---|---|
| AID1 | ENABLED | 3 | 0-2 |
| AID2 | DISABLED | 2 | - |
| AID3 | ENABLED | 2 | 3-4 |

FIG. 3

| SD-AID | DEFAULT SELECTED APPLI | ALLOCATED LOGICAL CHANNEL |
|---|---|---|
| AID1 | A13 | 0 |
| AID2 | A21 | - |
| AID3 | A32 | 3 |

FIG. 4

SYSTEM AND METHOD FOR MANAGING LOGICAL CHANNELS FOR ACCESSING SEVERAL VIRTUAL PROFILES IN A SECURE ELEMENT

FIELD OF THE INVENTION

The present invention relates to methods for managing logical channels for accessing several profiles embedded in a secure element. It relates particularly to methods of managing several active profiles in a secure element.

BACKGROUND OF THE INVENTION

A secure element is either a tamper-resistant physical component able to store data and to provide services in a secure manner or a software component providing a trusted storage area and trusted services. In general, a secure element has a limited amount of memory, a processor with limited capabilities and is devoid of battery. For instance a UICC (Universal Integrated Circuit Card) is a secure element which embeds SIM applications for telecommunication purposes. A secure element can be installed, fixedly or not, in a terminal, like a mobile phone for example. In some cases, the terminals are constituted by machines that communicate with other machines for M2M (Machine to Machine) applications.

A secure element can be in the format of a smart card, or may be in any other format such as for example but not limited to a packaged chip as described in PCT/SE2008/050380, or any other format. A UICC can be used in mobile terminals in GSM, CDMA or UMTS networks for instance. The UICC ensures network authentication, integrity and security of all kinds of personal data. The UICC communicates and cooperates with the baseband (also called baseband processor or baseband radio processor) of the terminal equipment.

It is known to solder or weld the secure element in a host device, in order to get it dependent of this host device. This is done in M2M (Machine to Machine) applications. The same objective is reached when a chip (a secure element) containing a Payment application, SIM or USIM applications and files is contained in the host device. The chip is for example soldered to the mother-board of the host device or machine and constitutes an embedded-secure element (eSE).

A secure element may contain a profile which can include a set of applications, a set of personal data and a set of secret data.

The profile could be linked to a subscription. It may contain network access applications (NAA), payment applications or third party applications providing security for a specific service (e.g. NFC applications).

A physical secure element can emulate several virtual secure elements, each one represented as one profile. In such a case, these profiles are called logical profiles or virtual profiles. An emulated profile is hereinafter called virtual profile. Usually each virtual profile is a software based profile.

The invention concerns a way to manage several virtual profiles which are run in parallel in a single secure element.

In the state of the art, the basic behaviour is to manage only one active virtual profile at a time. An active virtual profile may use several logical channels in parallel. A swap operation allows to disable the currently active virtual profile and to active another one. Thus only one virtual profile is active at a time in a device session. Moreover, according to the ISO7816-4 standard, the logical channel 0 (zero) has a specific role: it is the default one allowing to retrieve the Answer-To-Reset (ATR) from the secure element. The logical channel 0 is allocated to the default selected application of the virtual profile. In addition, the logical channel 0 is used as the main channel for some types of commands (e.g. Proactive commands as defined in ETSI TS 102 223 for example).

There is a need to handle several sets of logical channel(s) for accessing as many virtual profiles simultaneously active in a secure element.

SUMMARY OF THE INVENTION

An object of the invention is to solve the above mentioned technical problem.

The object of the present invention is a system comprising a host device and a secure element connected to the host device, the secure element comprising a plurality of virtual profiles and an execution component configured to run simultaneously several of said plurality of virtual profiles, the system comprising a discovery agent configured to provide a subset of the plurality of virtual profiles and configuration data for each virtual profile of said subset. The system comprises capability data reflecting the maximum of logical channels handled by the host device. The system comprises an allocating agent configured to cooperate with the discovery agent to allocate a range of logical channels to each virtual profile of the subset based on the capability data and to determine in each of the ranges a main logical channel which remains permanently available when the virtual profile to which the range is allocated has been booted.

Advantageously, the secure element may store each virtual profile of said plurality of virtual profiles in as many security domains, the discovery agent may have a fixed identifier and the discovery agent may be stored and managed in the secure element independently of the security domains.

Advantageously, each virtual profile may have a current state which can be either enabled or disabled, the configuration data may provide the current state of each virtual profile and the allocating agent may be configured to allocate a range of logical channels only to the virtual profiles having an enabled current state.

Advantageously, each virtual profile may have a current state which can be either enabled or disabled, the subset provided by the discovery agent may contain only virtual profiles having an enabled current state.

Advantageously, each virtual profile may have a current state which can be either enabled or disabled, the system may comprise a registry containing the current state of all virtual profiles and said registry may be managed by an entity configured to automatically update the registry each time a virtual profile is enabled, disabled, installed or removed, said entity being either the discovery agent or a spying agent stored in the system.

Advantageously, each virtual profile may have a current state which can be either enabled or disabled and the secure element may be configured to automatically initiate an allocation of range of logical channels as soon as the a virtual profile is enabled, disabled or removed.

Advantageously, each virtual profile may comprise an application selected by default and the system may be configured to assign the main logical channel to the application selected by default for each virtual profile.

Another object of the invention is a method for managing logical channels in a system comprising a host device and a secure element connected to the host device. The secure element includes a plurality of virtual profiles and an execution component configured to run simultaneously several of said plurality of virtual profiles. The system includes capability data reflecting the maximum of logical channels handled by the host device. The method comprises the following steps:

identifying a subset of virtual profiles which have an enabled state, allocating a range of logical channels to each virtual profile of the subset based on the capability data, determining in each of the allocated ranges a main logical channel which remains permanently available when the virtual profile to which the range is allocated has been booted.

Another object of the invention is a secure element able to connect a host device. The secure element includes a plurality of virtual profiles and an execution component configured to run simultaneously several of said plurality of virtual profiles. The secure element includes a discovery agent configured to provide a subset of the plurality of virtual profiles and configuration data for each virtual profile of said subset, the configuration data including a number of logical channels required for running each virtual profile. The secure element includes a command dispatcher configured to receive from the host device a range of logical channels allocated to each virtual profile of the subset and to determine in each of the ranges a main logical channel which remains permanently available when the virtual profile to which the range is allocated has been booted.

Another object of the invention is a host device connected to a secure element comprising a plurality of virtual profiles and an execution component configured to run simultaneously several of said plurality of virtual profiles. The host device is configured to send a request to the secure element for retrieving a subset of the plurality of virtual profiles and configuration data for each virtual profile of said subset. The host device includes capability data reflecting the maximum of logical channels handled by the host device. The host device includes an allocating agent configured to cooperate with the discovery agent to allocate a range of logical channels to each virtual profile of the subset based on the capability data and to determine in each of the ranges a main logical channel which remains permanently available when the virtual profile to which the range is allocated has been booted

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which:

FIG. 2 is an example of a set of virtual profile and associated configuration data according to the invention, FIG. 3 is an example of ranges of logical channel allocated to the virtual profiles comprised in a secure element according to the invention, and FIG. 4 is an example of a logical channels allocated to the default selected application of the virtual profiles comprised in a secure element according to the invention.

DETAILED DESCRIPTION OF THE PREFERRED EMBODIMENTS

Figure 1:
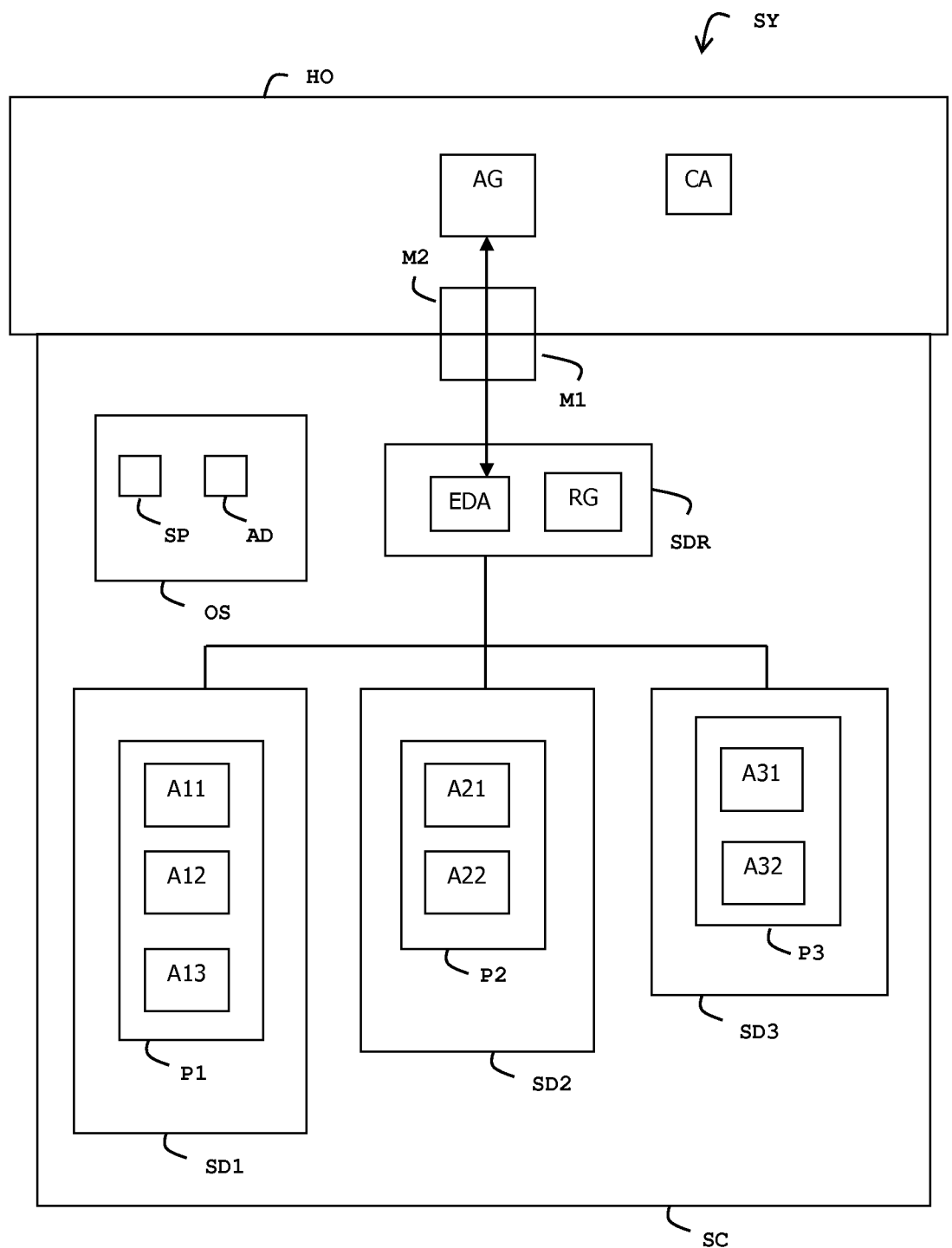
FIG. 1 is an example of a system comprising a host device and a secure element according to the invention.

The invention may apply to any types of secure element intended to contain several virtual profiles and able to communicate through a plurality of logical channels. In particular, the invention applies to secure elements of UICC type and embedded-UICC (e-UICC) type.

The secure element may be coupled to any type of host machine able to establish a communication session with the secure element. For example the host machine may be a mobile phone, tablet PC, a vehicle, a meter, a slot machine, a TV or a computer.

FIG. 1 shows a system SY comprising a host device HO and a secure element SC according to the invention.

In this example, the host device HO is a mobile phone having a single hardware communication interfaces M2 for communicating with a secure element. The host device HO comprises several basebands (not drawn) which are designed to communicate with secure elements of UICC type. The host device HO comprises a communication component (not drawn) configured to multiplex messages sent to (and to demultiplex messages received from) the secure element SC through the hardware communication interfaces M2. More specifically, the communication component is configured to allow the basebands to simultaneously communicate with as many distinct virtual profiles embedded in the secure element SC. The host device HO is configured to uniquely assign a baseband to each virtual profile having an "enabled" state. Thanks to the allocation of both a baseband and a logical channel range to each "enabled" virtual profile, the host device HO can reboots (reset) each virtual profile independently of the others.

The secure element SC is an UICC which comprises a communication interface M1, an operating system OS and four security domains SDR, SD1, SD2 and SD3 (as defined by Global Platform Card Specifications v2.x). The security domain SD1 comprises a virtual profile P1, the security domain SD2 comprises a virtual profile P2 and the security domain SD3 comprises a virtual profile P3. The secure element SC comprises an execution component (not drawn) which is configured to run simultaneously several virtual profiles.

The virtual profile P1 comprises three applications A11, A12 and A13. The application A13 is the application selected by default (default selected application) in the virtual profile P1. For example, the application A13 is a Telecom application (UICC), the application A11 is a payment application and the application A12 is a transport application.

Similarly, the virtual profile P2 comprises two applications A21 and A22, where A21 is one that is selected by default and the virtual profile P3 comprises two applications A31 and A32, where A32 is one that is selected by default.

The virtual profile P1 and P3 are enabled while the virtual profile P2 is disabled. In other words, the virtual profile P1 and P3 are active.

The security domain SDR acts as a root security domain. The other security domains (SD1-SD3) depend on the security domain SDR. The security domain SDR comprises a discovery agent EDA which is configured to provide a subset of the virtual profiles embedded in the secure element SC and configuration data corresponding to each virtual profile of the subset. The security domain SDR does not comprise any virtual profile. Since the discovery agent EDA belongs to the security domain SDR, the discovery agent EDA is stored and managed independently of the virtual profiles (i.e. independently of the other security domains) embedded in the secure element SC.

The configuration data includes at least the number of logical channels required for running each virtual profile that belongs to the subset.

Advantageously, the discovery agent EDA can have a fixed identifier (common to a batch of secure elements) so that the host device can be configured to easily access the discovery agent EDA.

The operating system OS comprises a command dispatcher AD which is in charge to forward the commands received through the communication interface M1 to the relevant virtual profile or application according to the used logical channel.

The host device HO comprises a capability data CA reflecting the maximum of logical channels handled by the host device HO. For instance, the capability data CA may indicate that the host device HO can manage up to 20 logical channels.

The host device HO comprises an allocating agent AG which is configured to allocate a range of logical channels only to the virtual profiles having an "enabled" current state. The allocating agent AG uses the capability data CA when allocating the ranges of logical channels. The allocating agent AG is adapted to provide the command dispatcher AD with the allocated ranges. In one example, the allocating agent AG directly sends the allocated ranges to the command dispatcher AD. In another example, the allocating agent AG sends the allocated ranges to the discovery agent EDA which in turn sends the allocated ranges to the command dispatcher AD.

In one embodiment, the main channel (also called basic channel) of virtual profile is defined as the logical channel having the lowest number among the range of logical channels allocated to the virtual profile.

In another embodiment, the main channel is selected by the allocating agent AG or by the discovery agent EDA either at random or according to a preset criterion (e.g. fixed number required by an application).

The main channel remains permanently available for communicating with a virtual profile which has been booted. The main channel is automatically opened when the virtual profile is booted. The other logical channels (i.e. different from the main channel) can be opened and closed at any time as needed.

Preferably, the main channel is assigned to the application selected by default in the virtual profile.

In the example of FIG. 1, the security domain SDR comprises a registry RG which contains the current state of all virtual profiles embedded in the secure element SC. Advantageously, the registry RG may also contain the number of required logical channels for each virtual profile.

In the example of FIG. 1, the operating system OS comprises a spying agent SP configured to automatically update the registry RG each time a virtual profile is installed, removed, enabled or disabled. Alternatively, the discovery agent EDA may act as the spying agent SP and automatically update the registry RG.

Advantageously, the spying agent SP (or the discovery agent EDA) may be configured to automatically initiate a new allocation of logical channel ranges as soon as a virtual profile is becomes enabled, disabled or is removed from the secure element SC.

In another example, the discovery agent EDA and the allocating agent AG may be both implemented on the same side: either in the host device HO or in the secure element SC.

According to an example of the invention, the method for allocating logical channels to the virtual profiles may be performed as follows.

During a first step, the host device HO resets the secure element SC which sends its Answer-To-Reset (ATR according to ISO7816-3) via the logical channel 0.

Then at a second step, the host device HO requires the discovery agent EDA to transmit a list of virtual profiles and the configuration data associated to each virtual profile.

Preferably, the list comprises all virtual profiles embedded in the secure element SC. The list comprises an identifier (AID of the security domain comprising the virtual profile for instance) corresponding to each virtual profile. In this case, the configuration data comprises the state of each virtual profile and the number of logical channel(s) required for each virtual profile.

FIG. 2 shows an example of the list and associated configuration data that are sent by the discovery agent EDA.

The security domain of the virtual profile P1 has an identifier equal to AID1, a state set to "enabled" and needs three logical channels to run.

Similarly, the security domain of the virtual profile P2 has an identifier equal to AID2, a state set to "disabled" and needs two logical channels to run and the security domain of the virtual profile P3 has an identifier equal to AID3, a state set to "enabled" and needs two logical channels to run.

Alternatively, the list may comprise only the virtual profiles having a state set to "enabled". In this case, the sent data comprise only the identifier of the security domain comprising each virtual profile and the associated required logical channel.

In both cases, the system identifies the subset of virtual profiles which have an "enabled" state.

It should be noted that this subset can comprise only a part of the virtual profiles embedded in the secure element SC, can comprise all virtual profiles embedded in the secure element SC or can even be empty.

At a third step, the host device HO allocates a range of logical channel(s) to each virtual profile belonging to the subset. The allocation operation is carried out using the capability data CA. If the maximum number of logical channels handled by the host device HO is too low, a temporary allocation of logical channels may be performed. In another example, a monitoring agent may analyze the behavior of the virtual profiles to track the real number of logical channels used by each virtual profile. Thus the monitoring agent may detect that a specific virtual profile uses fewer than the number of logical channels previously required. For instance the monitoring agent may detect that a virtual profile only uses 2 logical channels among the 3 initially required logical channels. In this case only two logical channels will be allocated to this virtual profile. In another example, the host device HO may ask the user to disable a service so that the overall need decreases.

At a fourth step, a main channel is determined in each allocated range.

At a fifth step, the allocated ranges are sent to the EDA.

The FIG. 3 shows an example of allocation of logical channel(s) range to the "enabled" virtual profiles. The logical channels 0, 1 and 2 are allocated to the virtual profile P1 and the logical channels 3 and 4 are allocated to the virtual profile P3. No logical channel is allocated to the virtual profile P2 since it is in a "disabled" state.

At a sixth step, the discovery agent EDA provides the command dispatcher AD with the allocated ranges. The main channel is linked to the application selected by default in each virtual profile.

The FIG. 4 shows the main logical channel assigned to the default selected application of each "enabled" virtual profile. In the virtual profile P1, the logical channel 0 has been assigned to the application A13 and in the virtual profile P3, the logical channel 3 has been assigned to the application A32.

At a seventh step, the host device HO boots each virtual profile having an "enabled" state by using the main channel of each virtual profile.

When the state of a virtual profile has changed, the discovery agent EDA (or the spying agent SP) can be configured to inform the allocating agent AG to start a new logical channel allocation process. Advantageously, this request for new allocation can be sent using the main logical channel of any "enabled" virtual profile. If there is no "enabled" virtual profile, the request may be sent through the logical channel 0.

The logical channels used at FIGS. 1-4 comply with ISO7816-4 and are provided as examples only. The logical channel mechanism may be different, provided that the logical channels allow exchanging data through a single physical communication interface.

It must be understood, within the scope of the invention, that the above-described embodiments are provided as non-limitative examples. In particular, the secure element may comprise any number of virtual profiles. The Host device is not necessary a Telecom equipment. The virtual profile can be a subscription for any kind of services: payment, service access, transport, loyalty or identity for example.

The architecture of the host device and the architecture of the secure element shown at FIG. 1 are provided as examples only. These architectures may be different. For example, the allocating agent AG and the discovery agent EDA may be merged as a unique agent.

The above described communication interfaces are physical interfaces which may work in either contact mode or in contactless mode.

The invention claimed is:

1. A system comprising:
a host device including a processor; and
a secure element connected to the host device, the secure element including a processor and a plurality of virtual profiles,
wherein said processor of the secure element is configured to enable simultaneous communication with several of said plurality of virtual profiles,
wherein one of said processors is configured to execute a discovery agent to provide a subset of the plurality of virtual profiles and configuration data for each virtual profile of said subset,
wherein the system (i) includes capability data reflecting the maximum of logical channels handled by the host device, and (ii) is compliant with ISO7816-4, and
wherein one of said processors is configured to execute an allocating agent to cooperate with the discovery agent to allocate a range of logical channels to each virtual profile of the subset based on the capability data and to determine in each of the ranges a main logical channel which remains permanently available when the virtual profile to which the range is allocated has been booted.

2. The system according to claim 1, wherein the secure element stores each virtual profile of said plurality of virtual profiles in as many security domains, wherein the discovery agent has a fixed identifier and is stored and managed in the secure element independently of said security domains.

3. The system according to claim 1, wherein each virtual profile has a current state which is either enabled or disabled, wherein the configuration data provides the current state of each virtual profile and wherein the processor is further configured to execute the allocating agent to allocate a range of logical channels only to the virtual profiles having an enabled current state.

4. The system according to claim 1, wherein each virtual profile has a current state which is either enabled or disabled, wherein the subset provided by the discovery agent contains only virtual profiles having an enabled current state.

5. The system according to claim 1, wherein each virtual profile has a current state which is either enabled or disabled, wherein the system comprises a registry containing the current state of all virtual profiles and wherein said registry is managed by either the discovery agent or a spying agent, executed by the processor of said secure element, to automatically update the registry each time a virtual profile is enabled, disabled, installed or removed.

6. The system according to claim 1, wherein each virtual profile has a current state which is either enabled or disabled and wherein the processor of the secure element is configured execute a spying agent for automatically initiating an allocation of range of logical channels as soon as a virtual profile is enabled, disabled or removed.

7. The system according to claim 1, wherein each virtual profile comprises an application selected by default and wherein one of said processors is configured to execute said allocating agent for assigning the main logical channel to the application selected by default for each virtual profile.

8. A method for managing logical channels in a system comprising (i) a host device including a processor and (ii) a secure element connected to the host device and including a processor and a plurality of virtual profiles, wherein said logical channels are compliant with ISO7816-4, and wherein the system includes capability data reflecting the maximum of logical channels handled by the host device, the method comprising the steps:
identifying a subset of virtual profiles which have an enabled state,
allocating a range of logical channels to each virtual profile of the subset based on the capability data, and
determining in each of the allocated ranges a main logical channel which remains permanently available when the virtual profile to which the range is allocated has been booted,
wherein the processor of the secure element is configured to enable simultaneous communication with several of said plurality of virtual profiles.

9. A secure element configured to connect to a host device, the secure element comprising:
a processor; and
a plurality of virtual profiles,
wherein the processor of the secure element is configured to enable simultaneous communication with several of said plurality of virtual profiles,
wherein the processor of the secure element is configured to execute a discovery agent to provide a subset of the plurality of virtual profiles and configuration data for each virtual profile of said subset, the configuration data including a number of logical channels required for running each virtual profile, said logical channels being compliant with ISO7816-4, and
wherein the processor of the secure element is configured to execute a command dispatcher to receive, from the host device, a range of logical channels allocated to each virtual profile of the subset and to determine in each of the ranges a main logical channel which remains permanently available when the virtual profile to which the range is allocated has been booted.

10. A host device connected to a secure element comprising a processor and a plurality of virtual profiles, wherein the processor of the secure element is configured to enable simultaneous communication with several of said plurality of virtual profiles, the host device comprising:
a processor configured to send a request to the secure element for retrieving a subset of the plurality of virtual profiles and configuration data for each virtual profile of said subset,
wherein the host device includes capability data reflecting the maximum of logical channels handled by the host device, said logical channels being compliant with ISO7816-4, and
wherein one of said processors is configured to execute an allocating agent of the host device to cooperate with a discovery agent executed by one of said processors to allocate a range of logical channels to each virtual profile of the subset based on the capability data and to determine in each of the ranges a main logical channel which remains permanently available when the virtual profile to which the range is allocated has been booted.

11. The system according to claim 1, wherein each virtual profile has a current state which is either enabled or disabled and wherein the processor of said secure element is configured to execute the discovery agent to automatically initiate an allocation of range of logical channels as soon as one of said virtual profiles is enabled, disabled or removed.

12. A system comprising:
a host device including a processor; and
a secure element connected to the host device and including a processor and a plurality of virtual profiles, said the processor of the secure element being configured to execute an execution component to run simultaneously several of said plurality of virtual profiles,
wherein one of said processors is configured to execute a discovery agent of the system to provide a subset of the plurality of virtual profiles and configuration data for each virtual profile of said subset,
wherein the system further comprises capability data reflecting the maximum of logical channels handled by the host device,
wherein one or more of said processors is configured to execute an allocating agent of the system to cooperate with the discovery agent to allocate a range of logical channels to each virtual profile of the subset based on the capability data and to determine in each of the ranges a main logical channel which remains permanently available when the virtual profile to which the range is allocated has been booted,
wherein each virtual profile has a current state which is either enabled or disabled,
wherein the system further comprises a registry containing the current state of all virtual profiles and
wherein said registry is managed by the discovery agent or a spying agent, executed by the processor of said secure element, to automatically update the registry each time a virtual profile is enabled, disabled, installed or removed.

13. The system according to claim 12, wherein the secure element stores each virtual profile of said plurality of virtual profiles in as many security domains, wherein the discovery agent has a fixed identifier and is stored and managed in the secure element independently of said security domains.

14. The system according to claim 12, wherein each virtual profile has a current state which is either enabled or disabled, wherein the configuration data provides the current state of each virtual profile and wherein the processor, executing the allocating agent, is configured to allocate a range of logical channels only to the virtual profiles having an enabled current state.

15. The system according to claim 12, wherein each virtual profile has a current state which is either enabled or disabled, wherein the subset provided by the discovery agent contains only virtual profiles having an enabled current state.

16. The system according to claim 12, wherein each virtual profile has a current state which is either enabled or disabled and wherein the processor of said secure element is configured to execute a spying agent to automatically initiate an allocation of range of logical channels as soon as one of said virtual profiles is enabled, disabled or removed.

17. The system according to claim 12, wherein each virtual profile comprises an application selected by default and wherein one of said processors is configured to execute the allocating agent to assign the main logical channel to the application selected by default for each virtual profile.

18. A method for managing logical channels in a system comprising (i) a host device including a processor and (ii) a secure element connected to the host device and including a processor and a plurality of virtual profiles, wherein the processor of the secure element is configured to execute an execution component to run simultaneously several of said plurality of virtual profiles, wherein the system comprises capability data reflecting the maximum of logical channels handled by the host device, wherein each virtual profile has a current state which is either enabled or disabled, wherein the system comprises a registry containing the current state of all virtual profiles, and wherein the method comprises the steps of:
identifying a subset of virtual profiles which have an enabled state,
allocating a range of logical channels to each virtual profile of the subset based on the capability data,
determining in each of the allocated ranges a main logical channel which remains permanently available when the virtual profile to which the range is allocated has been booted, and
automatically updating the registry each time a virtual profile is enabled, disabled, installed or removed.

19. A secure element, of a system, configured to connect a host device, the secure element comprising:
a processor; and
a plurality of virtual profiles,
wherein the processor of the secure element is configured to execute an execution component of the secure element to run simultaneously several of said plurality of virtual profiles,
wherein the processor is configured to execute a discovery agent of the secure element to provide a subset of the plurality of virtual profiles and configuration data for each virtual profile of said subset, the configuration data including a number of logical channels required for running each virtual profile,
wherein the processor is configured to execute a command dispatcher of the secure element to receive, from the host device, a range of logical channels allocated to each virtual profile of the subset and to determine in each of the ranges a main logical channel which remains permanently available when the virtual profile to which the range is allocated has been booted, wherein each virtual profile has a current state which is either enabled or disabled, wherein the system comprises a registry containing the current state of all virtual profiles, and wherein said registry is managed by the discovery agent or a spying agent, executed by the processor of said secure element, to automatically update the registry each time a virtual profile is enabled, disabled, installed or removed.

20. A host device, of a system, connected to a secure element comprising a processor and a plurality of virtual profiles, wherein the processor of the secure element is configured to execute an execution component to run simultaneously several of said plurality of virtual profiles, the host device comprising:

a processor configured to send a request to the secure element for retrieving a subset of the plurality of virtual profiles and configuration data for each virtual profile of said subset, wherein the host device includes capability data reflecting the maximum of logical channels handled by the host device, wherein one of said processors is configured to execute an allocating agent of the host device to cooperate with a discovery agent, executed by one of said processors, to allocate a range of logical channels to each virtual profile of the subset based on the capability data and to determine in each of the ranges a main logical channel which remains permanently available when the virtual profile to which the range is allocated has been booted, wherein each virtual profile has a current state which is either enabled or disabled, wherein the system includes a registry containing the current state of all virtual profiles, and wherein said registry is managed by the discovery agent or a spying agent, executed by the processor of said secure element, to automatically update the registry each time a virtual profile is enabled, disabled, installed or removed.

* * * * *